(12) United States Patent
Makey et al.

(10) Patent No.: US 12,034,724 B2
(45) Date of Patent: Jul. 9, 2024

(54) ADVERSE USER BEHAVIOR DETECTION AND MITIGATION

(71) Applicant: Microsoft Technology Licensing LLC, Redmond, WA (US)

(72) Inventors: Kristopher Aaron Makey, Kirkland, WA (US); Alexis Descre, Seattle, WA (US); Donald T. Sprague, Seattle, WA (US); William Sean Sheehan, Seattle, WA (US); Warren Michael Alpert, Cambridge, MA (US); Robert Mitchell Smith, Seattle, WA (US); Arnav Kumar Agrawal, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 515 days.

(21) Appl. No.: 17/089,336

(22) Filed: Nov. 4, 2020

(65) Prior Publication Data

US 2022/0141223 A1    May 5, 2022

(51) Int. Cl.
*H04L 9/40* (2022.01)
*G06Q 50/00* (2012.01)

(52) U.S. Cl.
CPC .......... *H04L 63/10* (2013.01); *G06Q 50/01* (2013.01); *H04L 63/1425* (2013.01)

(58) Field of Classification Search
CPC ..... G06Q 50/01; H04L 63/10; H04L 63/1425; H04W 4/21; H04W 12/66
See application file for complete search history.

(56) References Cited

U.S. PATENT DOCUMENTS

| 8,955,129 | B2 | 2/2015 | Cao et al. | |
| 9,424,612 | B1* | 8/2016 | Bright | G06F 16/9535 |
| 9,705,885 | B2 | 7/2017 | Erdal | |
| 10,333,964 | B1 | 6/2019 | Freeman et al. | |
| 2004/0192339 | A1* | 9/2004 | Wilson | H04W 4/021 |
| | | | | 455/466 |

(Continued)

OTHER PUBLICATIONS

Paquet-Clouston, et al., "Can We Trust Social Media Data? Social Network Manipulation by an IoT Botnet", In Proceeding of International Conference on Social Media & Society, Jul. 28, 2017, pp. 1-9.

(Continued)

*Primary Examiner* — Gil H. Lee

(57) ABSTRACT

Aspects of the present disclosure relate to adverse user behavior detection and mitigation. In examples, a user account of a social platform may be trusted or untrusted. If the user account is untrusted, activity of the user account may be buffered so as to not directly affect social metrics of the social platform. For example, if the untrusted user account follows a target user account, the untrusted user account may be added to a separate set of followers or otherwise separated from a set of trusted followers of the target user account. Eventually, each user account in the separate set is evaluated to determine whether the user account has transitioned to a trusted user. If the user account is now trusted, it may be migrated to the set of trusted followers. However, if the user account is untrusted, it may be removed from the separate set, thereby reverting the activity.

13 Claims, 9 Drawing Sheets

(56) References Cited

U.S. PATENT DOCUMENTS

2010/0317319 A1* 12/2010 Gorman ............ H04M 3/42382
455/410

OTHER PUBLICATIONS

Taban, Mehmet, "FakeFind—Clean Fake Followers", Retrieved from: https://apps.apple.com/us/app/fakefind-clean-fake-followers/id1450202602, Retrieved Date: Aug. 30, 2020, 5 Pages.

Yu, et al., "SybilLimit: A Near-Optimal Social Network Defense against Sybil Attacks", In Proceedings of IEEE Symposium on Security and Privacy, May 18, 2008, 15 Pages.

Yu, et al., "Untrusted User Detection in Microblogs", In Proceedings of IEEE 13th International Conference on Trust, Security and Privacy in Computing and Communications, Sep. 24, 2014, pp. 558-564.

* cited by examiner

ADVERSE USER BEHAVIOR DETECTION AND MITIGATION

BACKGROUND

Incentives may exist to artificially bolster or otherwise manipulate various metrics used by a social platform. For example, a user account with a high number of followers may be viewed as trustworthy or content with a large number of views or likes may be perceived as popular. However, manipulation of such metrics may have a negative effect on the user experience of the social platform.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to adverse user behavior detection and mitigation. In examples, a user account of a social platform may be trusted or untrusted. If the user account is untrusted, activity of the user account may be buffered so as to not directly affect social metrics of the social platform. For example, if the untrusted user account follows a target user account, the untrusted user account may be added to a separate set of followers or otherwise separated from a set of trusted followers of the target user account. Eventually, the separate set of followers may reach a predetermined threshold, such that each user account in the separate set is evaluated to determine whether the user account has transitioned to a trusted user account. If the user account is now trusted, the user account may be migrated to the set of trusted followers. However, if the user account is untrusted, the user account may be removed from the separate set of followers, thereby reverting the activity.

In some examples, an indication is generated as a result of removing an untrusted user from the separate set of followers. Such indications may be aggregated and processed to determine whether the user account is exhibiting adverse behavior (e.g., whether the user account is being programmatically controlled) or is associated with a new user of the platform. Accordingly, if it is determined that the user account is exhibiting adverse behavior, corrective action may be taken against the user account.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
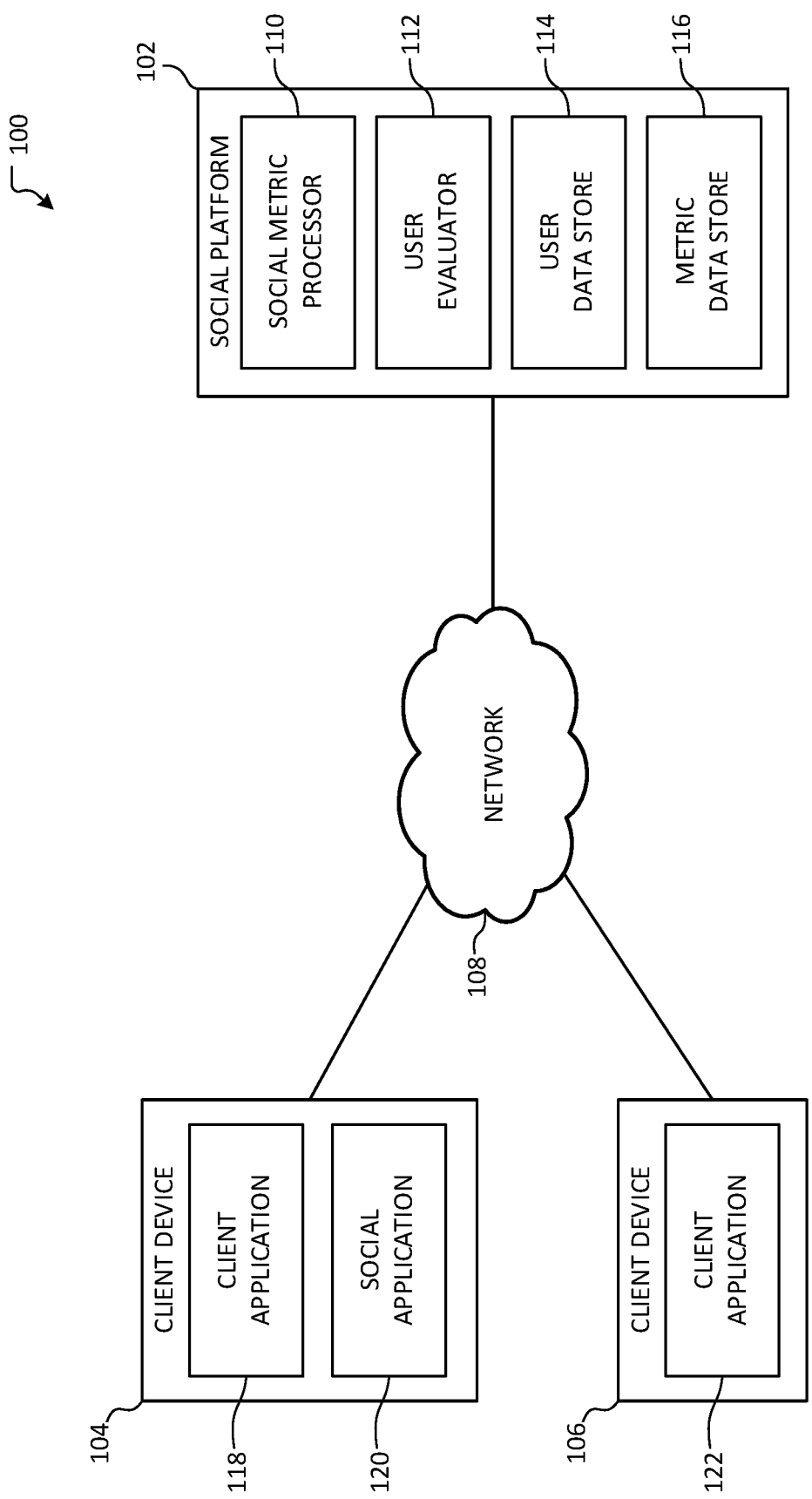
FIG. 1 illustrates an overview of an example system for adverse user behavior detection and mitigation.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a social platform generates or otherwise maintains various social metrics. For example, social metrics may relate to user interactions with other users of the platform, as well as user interactions with content and/or features of the platform, among other examples. Example social metrics include, but are not limited to, a set of followers for a target user, a follower count of the target user, a view count (e.g., for a video, a stream, or a photo), a like count (e.g., of a post or of linked content), and/or a share count (e.g., of a post of another user or of linked content). Such social metrics may be displayed to users of the social platform or used by the social platform to identify trends (e.g., to present trending content or suggest users follow a trending user). However, incentives may exist for a user to engage in adverse behavior to artificially bolster or otherwise manipulate such metrics.

For example, a user may artificially inflate the follower count associated with the user's account by creating and subsequently using multiple accounts to follow the original account of the user. As another example, the user may pay a third party to bolster the follower count using one or more user accounts that are programmatically controlled. As another example, a view count or like count may similarly be manipulated. Such adverse behavior is detrimental to the social platform, as legitimate users, as well as the platform itself, no longer have accurate information about the state of the social platform. For example, it may be difficult to determine the actual popularity (and, potentially, the associated trustworthiness) of a user account. Similarly, it may be difficult to determine the actual popularity of a post or other shared content.

Accordingly, aspects of the present disclosure relate to adverse user behavior detection and mitigation. Example social platforms include, but are not limited to, a social networking service (e.g., LINKEDIN, FACEBOOK, or TWITTER), a video sharing and/or streaming service (e.g., YOUTUBE or TWITCH), or a gaming service (e.g., XBOX LIVE, NINTENDO ONLINE, or PLAYSTATION NETWORK). Additionally, it will be appreciated that a user account may be associated with multiple social platforms, for example using a shared user data store or via OAuth, among other examples.

A user account may have an associated trust metric. The social platform maintains the trust metric according to signals generated by or otherwise associated with the user account. In some examples, the trust metric affects actions that can be performed by the user account. For examples, a user having a trust metric below a predetermined threshold may be unable to send direct or private messages to other users or may be unable to post certain content. As another example, actions performed by the user account that affect a social metric may be "buffered" or otherwise separated from metrics of the social platform using one or more buffer data structures, such that the actions do not directly affect the social platform.

Once the trust metric of a user account exceeds a predetermined threshold, the user account may be "trusted" by the social platform. Accordingly, user account activity may no longer be buffered. Additionally, activity that was previously buffered may be migrated from such buffer data structures and incorporated into the social metrics of the social platform. In some instances, once a user account becomes trusted, the user account and associated signals may be subject to reduced scrutiny. Even so, it will be appreciated that an account may regress to an "untrusted" state if signals cause the trust metric of the user account to fall below a predetermined threshold.

Any of a variety of signals may be used according to aspects of the present disclosure. Example signals include, but are not limited to, whether the user account has been used to complete a purchase or is otherwise associated with purchased content (e.g., purchased physical media or an in-game transaction), whether contact information (e.g., an email address or a phone number) has been verified, the age of the user account, a number of other user accounts associated with the user account (e.g., that follow the user account or that have messaged the user account), and/or whether the user account has successfully completed a CAPTCHA or other similar challenge. The social platform may identify and aggregate such signals, which may be associated with the user account. Signals associated with the user account are processed to generate or update a trust metric for the user account. The signals may be processed periodically and/or in response to the occurrence of an event, among other examples. In some examples, signals are processed as they are identified or may be processed in batches.

As described above, actions performed by an untrusted user account may be buffered using one or more buffer data structures. Example actions include, but are not limited to, following a target user account, liking content, or sharing content. For example, if the user account follows a target user, the user account may be added to a buffer data structure that is separate from the associated social metric (e.g., a set or list of followers) that stores followers associated with the target account. As another example, the untrusted user account may be added to the set of followers, but may also be added to the buffer data structure such that it is possible to identify untrusted users that have followed or are following the target account. As a further example, each follower in the set of followers may have a property that indicates whether the follower is buffered, thereby enabling later removal according to aspects disclosed herein. Similarly, if the untrusted user account is used to view a video or stream of the social platform, a buffer view count may be incremented rather than incrementing the view count social metric associated with the content. Thus, it will be appreciated that any of a variety of techniques may be used to separate untrusted user activity from trusted user activity, such that the untrusted user activity may be either merged with trusted user activity or removed from the social platform at a later time.

A buffer data structure may be processed to either incorporate user activity into an associated social metric or to remove user activity accordingly. For example, a threshold may be used, such that if the amount of activity in the buffer data structure exceeds the threshold, activity in the buffer data structure is processed. As another example, the buffer data structure may be processed periodically or in response to an event (e.g., a manual request to process the data structure or a user account transitioning from an untrusted state to a trusted state).

Thus, social metrics of the social platform need not be permanently affected by potentially adverse behavior of untrusted user accounts. Further, the impact on social metrics may be reduced as a result of the ability to revert such activity. This reduces or eliminates negative effects on the user experience of the social media platform, as metrics that are utilized by the social media platform or presented to users may be accurate within a margin of error (e.g., depending on the amount of time before a buffer data structure is processed or depending on the amount of user activity stored in the buffer data structure).

Additionally, aspects of the present disclosure may be preferable as compared to disabling functionality for an untrusted user account that may affect social metrics of the social platform. Such alternative techniques may negatively impact the user experience and may therefore deter or alienate new users. Further, adverse behavior may be discouraged as a result of the limited effect such behavior is permitted to have by use of the disclosed buffering techniques. For example, rather than permitting a target user account to amass a large number of untrusted (and therefore potentially fraudulent) followers, the target user account may instead only accumulate untrusted followers up to the threshold permitted by an associated buffer, after which such user accounts are automatically caused to unfollow the target user.

In some instances, an indication is generated when an untrusted user account is removed from a buffer. Such indications may be aggregated and subsequently processed to determine whether the user account is more generally exhibiting adverse behavior. For example, if the user account is removed from multiple buffers of multiple target users within a short period of time, it may be likely that the user account is under programmatic control rather than being used by an actual user. As another example, if the user account is repeatedly removed from a buffer associated with the same target user, the user account may be temporarily prevented from re-following the target user account for a predetermined period of time. Thus, aspects of the present disclosure not only reduce the impact on adverse behavior on metrics of the social platform, but further facilitate the discovery of adverse behavior therein.

FIG. 1 illustrates an overview of an example system 100 for adverse user behavior detection and mitigation. As illustrated, system 100 comprises social platform 102, client device 104, client device 106, and network 108. In examples, social platform 102 and client devices 104 and 106 communicate using network 108, which may comprise a local area network, a wireless network, or the Internet, or any combination thereof, among other examples.

Social platform 102 may comprise any of a variety of computing devices, including, but not limited to, a server computing device or a set of computing devices that form a distributed computing device. Similarly, client devices 104 and 106 may each be any of a variety of computing devices, including, but not limited to, a mobile computing device, a laptop computing device, a tablet computing device, or a desktop computing device. It will be appreciated that while system 100 is illustrated as comprising one social platform 102 and two client devices 104 and 106, any number of such elements may be used in other examples. For example, a client device may communicate with multiple social platforms, each of which may share a user account associated with the user of the client device. Further, the functionality described herein with respect to social platform 102 and client devices 104 and 106 may be distributed among or otherwise implemented on any number of different computing devices in any of a variety of other configurations in other examples. For example, social metric processor 110 and/or user evaluator 112 need not be restricted to social platform 102 and such aspects may alternatively or additionally be performed by client device 104 and/or client device 106.

Client device 104 is illustrated as comprising client application 118 and social application 120. Client application 118 may be any of a variety of applications, such as a web application executing in a web browser, a native application, or a combination thereof. For example, a user may use client application 118 to access a website of social platform 102. As another example, client application 118 may be a third-party application (e.g., that is not provided by social platform 102) that implements features of or otherwise accesses social platform 102 using an application programming interface (API). For example, client application 118 may be a third-party web application that incorporates functionality provided by social platform 102.

Similar to client application 118, social application 120 may be any of a variety of applications, such as a web application executing in a web browser, a native application, or a combination thereof. However, in contrast to client application 118, social application 120 may be distributed by social platform 102 or may otherwise be associated with social platform 102. A user of client device 104 may use client application 118 and/or social application 120 to perform actions via social platform 102. It will be appreciated that any of a variety of other techniques may be used to communicate with social platform 102. Additionally, client application 122 of client device 106 is similar to client application 118 of client device 104 and is therefore not necessarily re-described below in detail.

As discussed above, activity of a user of client device 104 via client application 118 and social application 120 may cause one or more signals to be generated and associated with a user account of social platform 102 (e.g., as may be stored in user data store 114). However, by virtue of the association between social application 120 and social platform 102, user signals generated via social application 120 may ultimately cause the user account to be a trusted user account more quickly than it otherwise would be as a result of user signals generated via client application 118. In other examples, client device 104 itself may be trusted (as compared to client device 106, which may not be trusted). For example, social application 120 may verify aspects of client device 104 (e.g., a serial number, a purchase date, available peripherals, or available hardware capabilities), which may be associated with the user account accordingly. Thus, the user account of the user of client device 104 may be trusted, as compared to a user account associated with client device 106.

Social platform 102 is illustrated as comprising social metric processor 110, user evaluator 112, user data store 114, and metric data store 116. As described above, social platform 102 receives user actions from client device 104 and client device 106. Social metric processor 110 generates or otherwise manages any of a variety of social metrics associated with social platform 102 based on such user actions. Social metrics may be stored in metric data store 116. For example, social metric processor 110 may manage a set of followers for a target user, a follower count of the target user, a view count (e.g., for a video, a stream, or a photo), a like count (e.g., of a post or of linked content), and/or a share count (e.g., of a post of another user or of linked content). Social metric processor 110 may mange fewer, additional, and/or alternative metrics in other examples.

As an example, a user account of a user of client device 104 may be a trusted user account of social platform 102. Accordingly, when social platform 102 receives a user action to follow a target user account of social platform 102, social metric processor 110 updates a set of followers for the target user account to reflect that the trusted user account is a follower of the target user account. However, a user account associated with client device 106 may instead be an untrusted user account of social platform 102. For example, a user of client device 106 may be a new user of social platform 102 or client device 106 may comprise software that automates actions associated with the untrusted user account.

As a result, when social platform 102 receives a user action to follow the target user account, social metric processor 110 instead buffers the follow action for the target user. For example, a buffer data structure (e.g., as may be stored in metric data store 116) may be updated to reflect that the untrusted user account is a follower of the target user account. As another example, the untrusted user may be added to the set of followers for the target user, but may comprise an indication that the untrusted user is a buffered follower of the target user.

Accordingly, social metric processor 110 may incorporate a buffer data structure when generating or otherwise providing a social metric for use by social platform 102. For example, a list of followers associated with a user may incorporate untrusted user accounts (e.g., as were buffered in the example described above) in addition to trusted user accounts. As another example, a view count may similarly reflect views by both untrusted and trusted user accounts. In other examples, social metric processor 110 may discount the influence of untrusted user accounts on a social metric. For example, a calculation of content popularity may place a greater weight on interactions with the content by trusted user accounts as compared to untrusted user accounts. Even so, once a user account becomes trusted, the action of the user account may be migrated from the buffer data structure, thereby effectively causing the impact of the action to be reweighted from the untrusted weight to the trusted weight. While examples herein are described in the context of trusted/untrusted user accounts, it will be appreciated that, in other examples, anonymous users (e.g., those that are not logged in with a user account of social platform 102) may be treated similarly to untrusted users. Additionally, a metric associated with an anonymous user may be transitioned to that of an untrusted/trusted user account as a result of the anonymous user completing a registration process, which may associate such anonymous activity with a user account.

User evaluator 112 may receive signals from application 118, 120, and/or 122 or may generate signals associated with a user account. The signals may be stored in user data store 114 and associated with one or more user accounts to which they relate. As described above, example signals include, but are not limited to, whether the user account has been used to complete a purchase or is otherwise associated with purchased content, whether contact information has been verified, the age of the user account, a number of other user accounts associated with the user account, and/or whether the user account has successfully completed a CAPTCHA or other similar challenge. Thus, as a user employs a client device (e.g., client device 104 or 106) to interact with social platform 102, user evaluator 112 generates and stores user signals accordingly.

User evaluator 112 processes a set of signals associated with a user account to generate a trust metric according to aspects described herein. User evaluator 112 may process the set of signals periodically, in response to an event, or any combination thereof. For example, user evaluator 112 may process user signals as they are generated or, as another example, may receive an indication from social metric processor 110 to generate an updated trust metric for a given user account. Any of a variety of techniques may be used to process the set of signals. For example, one or more machine learning models, statistical models, and/or sets of rules may be used to generate a trust metric for the user.

A generated trust metric may be compared to a predetermined threshold to determine whether an associated user account is in a trusted state. Accordingly, if the trust metric exceeds the predetermined threshold, user evaluator 112 may update a property of the user account in user data store 114 to indicate that the user account is trusted. It will be appreciated that any of a variety of techniques may be used to determine and/or otherwise store whether a user account is trusted. For example, a set of rules may ultimately generate a binary indication of whether a user account is trusted. As another example, a trusted state may be imported from a different user account (e.g., of social platform 102 or another social platform) or a user account may be placed in a trusted state by virtue of determining that a client device (e.g., client device 104 or 106) is a trusted device.

In some instances, once a user account becomes trusted, user evaluator 112 may no longer generate a trust metric for the user account or may update the trust metric at a reduced frequency. Even so, it will be appreciated that a user account may regress to an "untrusted" state if signals cause the trust metric of the user account to fall below the predetermined threshold. In some examples, the predetermined threshold to place a user account in a trusted state may be higher (e.g., more restrictive) than a subsequent predetermined threshold that is used to determine whether a user account regresses to an untrusted state.

Eventually, social metric processor 110 evaluates buffered user actions to either migrate buffered user activity to an associated social metric or remove user activity accordingly. For example, social metric processor 110 may evaluate a buffer data structure when the buffer data structure reaches a predetermined threshold (e.g., five entries or 2% of the social metric with which it is associated). As another example, social metric processor 110 may perform such processing periodically or in response to one or more other events.

Returning to the above example, when social metric processor 110 buffers the follow action to follow the target user by the untrusted user account (e.g., associated with client device 106), social metric processor 110 may determine that the buffer data structure exceeds a predetermined threshold. In some examples, the predetermined threshold is determined based at least in part on the target entity (e.g., a target user account, a target post, or a target video stream) to which it relates. For example, a different predetermined threshold may be used for a user account having 10,000 followers as compared to a user account having 100 followers. The predetermined threshold may be programmatically determined based on any of a variety of factors, including, but not limited to, a number of followers, an account age, the rate at which a user account gains followers, a number of likes, or a rate at which a post gains likes.

Accordingly, social metric processor 110 may evaluate all buffered actions associated with the buffer data structure. In the context of the above example, social metric processor 110 evaluates all buffered follow actions associated with the target user account. The evaluation may comprise evaluating each user account associated with the buffer data structure to determine whether the user account is in an untrusted state. For example, a given user account may still be untrusted (as was the case when the action associated with the target user account was buffered) or the user account may have been untrusted, achieved a trusted state, or regressed to an untrusted state. As another example, the given user account may have transitioned to a trusted state from the previously untrusted state. In some instances, the evaluation comprises providing an indication to user evaluator 112 to evaluate the given user account and update and associated trust metric and/or trust state.

For each user account associated with the buffer data structure that is trusted, the user action may be migrated from the buffer data structure to update an associated social metric of social platform 102 accordingly. For example, if the previously untrusted user account associated with client device 106 is now trusted, the user account may be moved to a set of followers for the target user. If, however, the untrusted user account remains untrusted, the follow action performed by the untrusted user account may be reverted (e.g., removed from the buffer), such that the untrusted user account no longer follows the target user account. Thus, the buffer data structure enables actions associated with untrusted user accounts to be temporarily buffered to reduce or eliminate associated effects of potentially adverse behavior on social metrics of social platform 102. If a user account becomes trusted in the interim (e.g., between an action of the user account and the above-described buffer evaluation), the action will be migrated from the buffer and associated social metrics will be updated accordingly. However, if the user account remains untrusted, the user action is removed from the buffer and therefore may not have a permanent effect on social metrics of social platform 102.

In some instances, the untrusted user account may be further associated with other buffers (e.g., of other target entities), such that all activity of the untrusted user account is not necessarily reverted by virtue of a single buffer evaluation. Rather, the evaluation is tied to the target entity itself and, further, may be triggered according to a predetermined threshold of the associated buffer. Thus, the above-described buffer evaluation may be independent of other buffer evaluations, such that an untrusted user account may be independently removed from multiple buffers.

Figure 2:
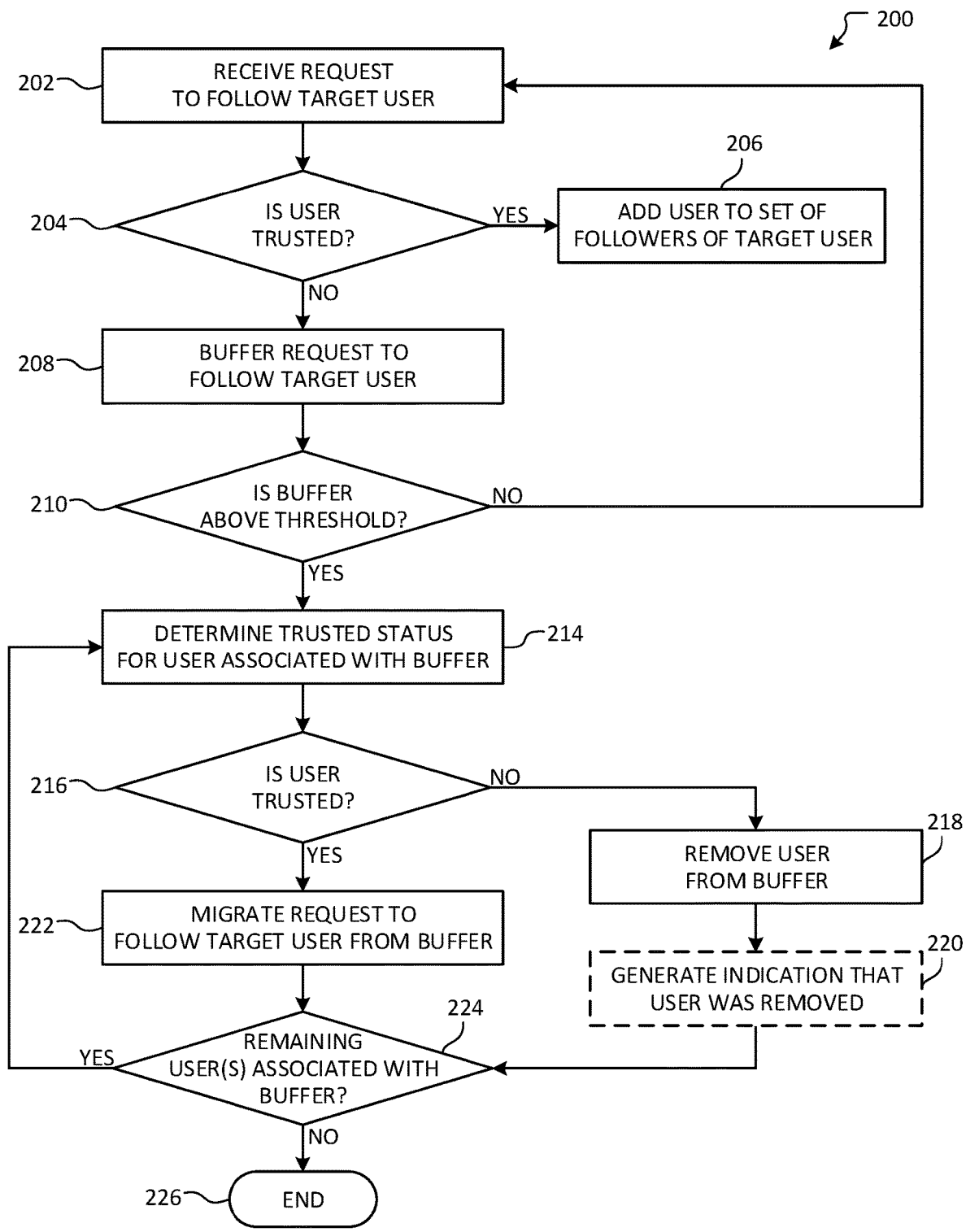
FIG. 2 illustrates an overview of an example method for adverse user behavior mitigation by an untrusted user account of a social platform.

FIG. 2 illustrates an overview of an example method 200 for adverse user behavior mitigation by an untrusted user account of a social platform. In examples, aspects of method 200 are performed by a social media platform, such as social media platform 102 in FIG. 1. In some examples, aspects of method 200 are performed by a social metric processor, such as social metric processor 110 in FIG. 1. While method 200 is described in the context of a request to follow a target user account, it will be appreciated that similar techniques may be used for any of a variety of social metrics and associated target entities.

Method 200 begins at operation 202, where a request is received to follow a target user account. For example, the request may be received from a client device, such as client device 104 or 106 in FIG. 1. The request may be associated with a user account of the social media platform (which may be referred to as a "requesting user account").

Flow progresses to determination 204, where it is determined whether the requesting user account is trusted. In examples, the determination comprises communicating with a user evaluator (e.g., user evaluator 112 in FIG. 1) to determine a trust metric associated with the user, such that the trust metric may be compared to a predetermined threshold or may otherwise indicate whether the user account is trusted. In another example, a user data store (e.g., user data store 114) is accessed to identify a property associated with the user account, where the property may indicate that the user account is either trusted or untrusted. Thus, it will be appreciated that any of a variety of techniques may be used to determine whether the user account is trusted.

If, at determination 204, it is determined that the user account is trusted, flow branches "YES" to operation 206 where the user account is added to a set of followers of the target user account. Flow terminates at operation 206. If, however, it is determined that the user account is not trusted, flow instead branches "NO" to operation 208, where the request to follow the target user is buffered. As described herein, the user account may be added to a buffer data structure, such as a separate set of users that follow the target user account. As another example, the user account may be added to the same set of followers (e.g., as is used by operation 206), but the entry may comprise an indication that the user account is a buffered follower of the target user account. Thus, it will be appreciated that any of a variety of techniques may be used to separate the activity of the untrusted user account from activity of trusted user accounts.

Flow progresses to determination 210, where it is determined whether the buffer is above a predetermined threshold. (e.g., five entries or 2% of the social metric with which it is associated). In some examples, the predetermined threshold is determined based at least in part on the target entity to which it relates. In the instant example, the determination may comprise evaluating a number of follow requests in the buffer to a predetermined threshold, which, in some examples, may depend on the number of followers of the target user. If it is determined that the buffer does not exceed the predetermined threshold, flow branches "NO" and returns to operation 202, where another request to follow the target user account is received from another requesting user account. Thus, operations 214-226 are not performed every time an untrusted user account follows the target user account, but rather are performed according to the predetermined threshold that is evaluated at determination 210.

If, however, it is determined at determination 210 that the buffer exceeds the predetermined threshold, flow instead branches "YES" to operation 214, where a trusted status is determined for a user account associated with the buffer. In some instances, operations 214-224 may be performed for user accounts other than the user account associated with the follow request that was received at operation 202. In such instances, the user account may not have had time to transition from an untrusted user account to a trusted user account. Similarly, in some examples, the evaluation may be performed for user accounts that have been associated with the buffer for a predetermined amount of time, thereby enabling the other user accounts additional time to transition from an untrusted user account to a trusted user account.

Operation 214 may comprise communicating with a user evaluator (e.g., user evaluator 112 in FIG. 1) to determine a trust metric associated with the user, such that the trust metric may be compared to a predetermined threshold. As another example, the user evaluator may indicate whether the user account is trusted. An indication may be provided to the user evaluator to reevaluate the user account accordingly. In another example, a user data store (e.g., user data store 114) is accessed to identify a property associated with the user account, where the property may indicate that the user account is either trusted or untrusted. Thus, it will be appreciated that any of a variety of techniques may be used to evaluate whether the user account is trusted.

At determination 216, it is determined whether the user account is trusted. The determination may comprise comparing a trust metric that was received or otherwise accessed at operation 214 to a predetermined threshold or evaluating a property of a user account, among other examples. If it is determined that the user account is not trusted, flow branches "NO" to operation 218, where the user account is disassociated from the buffer, thereby reverting the user activity. In some instances, flow progresses to operation 220, where an indication that the user account was removed is generated, which may be aggregated or otherwise processed by another component of the social platform to determine whether the user account is more generally associated with adverse behavior. Flow ultimately arrives at determination 224, which is discussed below.

If, however, it is determined that the user account is trusted, flow instead branches "YES" to operation 222 where the request to follow the target user account is migrated from the buffer, such that the user account is added to the set of followers of the target user account accordingly. Flow progresses to determination 224, where it is determined whether there is another user account associated with the buffer. If it is determined that an additional user account is associated with the buffer, flow branches "YES" and returns to operation 214, where a trusted status is determined for the remaining user account. Flow then continues to loop between operations 214-224 until no user accounts remain (or, as discussed above, a subset of user accounts remain, such as the user account associated with the request to follow the target user account that was received at operation 202). Thus, operation 222 or operations 218-220 are used to iteratively process user accounts associated with the buffer to either migrate user accounts out of the buffer or remove user activity associated with the user account accordingly. If, however, no user accounts remain, flow instead branches "NO" and method 200 ends at operation 226.

Figure 3:
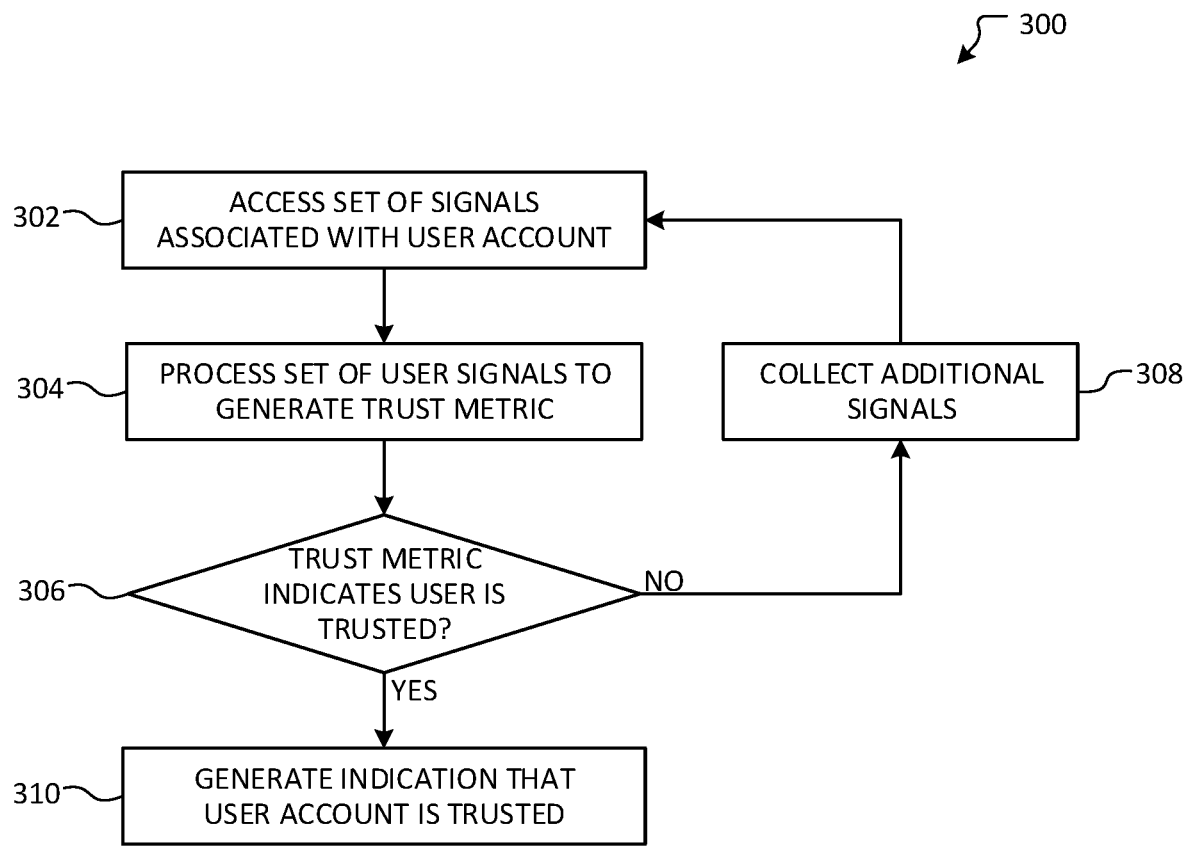
FIG. 3 illustrates an overview of an example method for determining a user account is trusted to facilitate detection and mitigation of adverse user behavior.

FIG. 3 illustrates an overview of an example method 300 for determining a user account is trusted to facilitate detection and mitigation of adverse user behavior. In examples, aspects of method 300 are performed by a social media platform, such as social media platform 102 in FIG. 1. In some examples, aspects of method 300 are performed by a user evaluator, such as user evaluator 112 in FIG. 1. Method 300 may be performed periodically, in response to an event, or any combination thereof. Method 300 may be performed to process user signals as they are generated or, as another example, may be performed in response to a request to generate an updated trust metric for a given user account (e.g., as may be generated at operation 214 of method 200 in FIG. 2).

Method 300 begins at operation 302, where a set of signals associated with a user account are accessed. In examples, the set of signals are stored in a user data store, such as user data store 114 in FIG. 1. As discussed above, example signals include, but are not limited to, whether the user account has been used to complete a purchase or is otherwise associated with purchased content, whether contact information has been verified, the age of the user account, a number of other user accounts associated with the user account, and/or whether the user account has successfully completed a CAPTCHA or other similar challenge. User signals accessed at operation 302 may have been generated and/or stored by a user evaluator (e.g., as may have been also received from a client device, such as client device 104 or 106 in FIG. 1).

Flow progresses to operation 304, where the set of user signals is processed to generate a trust metric for the user account. Processing the set of user signals may comprise utilizing one or more machine learning models, statistical models, and/or sets of rules. For example, the set of user signals may be processed as compared to an average set of signals for a population of users of the social platform. As another example, a machine learning model may be trained according to signals associated with a set of trusted user accounts, such that the machine learning model may be used to classify the set of user signals accordingly. Thus, it will be appreciated that any of a variety of techniques may be used to process the set of signals and generate a trust metric accordingly.

Flow progresses to determination 306, where it is determined whether the trust level indicates that the user account is trusted. The determination may comprise comparing the trust metric that was generated at operation 304 to a predetermined threshold. In such examples, if the generated trust metric exceeds the predetermined threshold, it is determined that the trust metric indicates that the user account is trusted. Other techniques may be used to process a trust metric accordingly. For example, a set of rules may provide a binary indication as to whether a user account is trusted.

If, at determination 306, it is determined that the trust metric does not indicate the user account is trusted, flow branches "NO" to operation 308, where additional signals are collected and associated with the user account. Thus, method 300 may be performed while a user account is untrusted, such that a trust metric for the user account may continue to be updated until the user account becomes a trusted user account. Flow returns to operation 302 and loops through operations 304, 306, and 308 accordingly. It will be appreciated that, in other examples, method 300 need not comprise such a loop and may instead be executed on a periodic bases or in response to one or more events.

If, however, it is determined that the trust metric indicates that the user account is trusted, flow instead branches "YES" to operation 310, where an indication is generated that the user account is trusted. In examples, the indication is a property associated with the user account in a user data store (e.g., user data store 114 in FIG. 1) that indicates that the user account is trusted. Flow terminates at operation 310.

Figure 4:
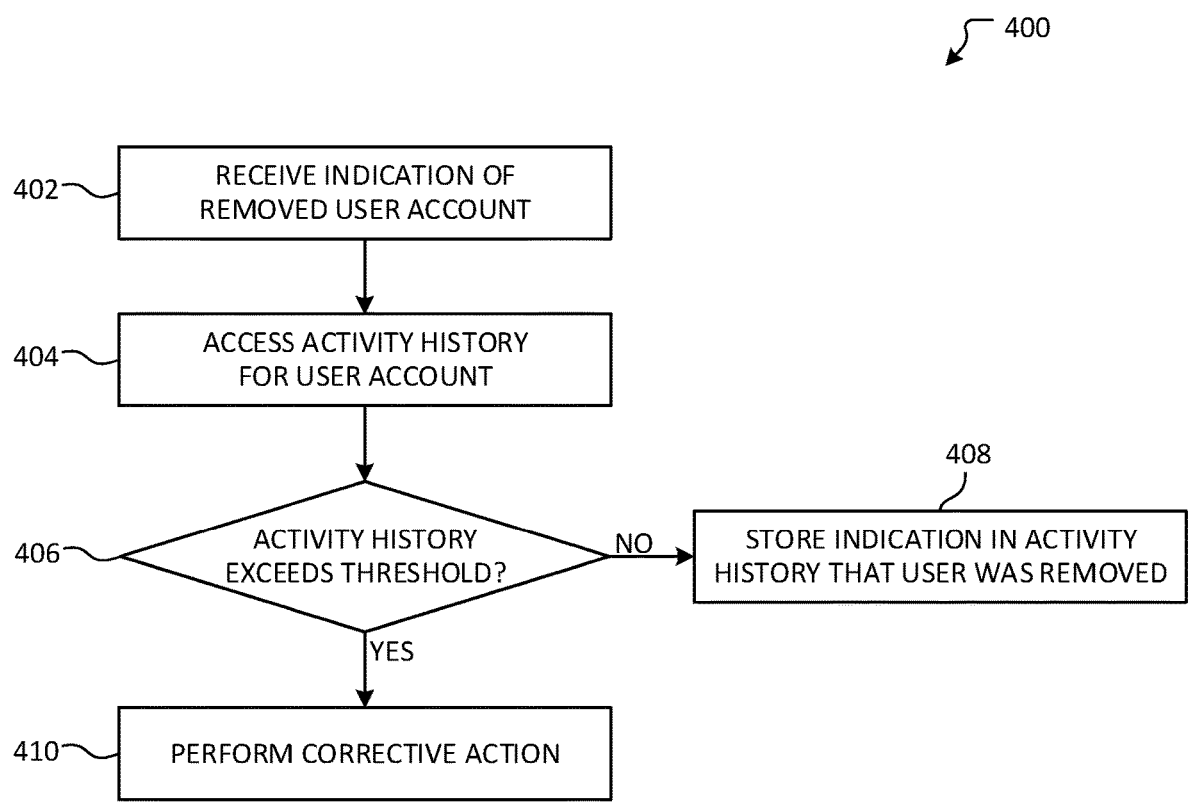
FIG. 4 illustrates an overview of an example method for adverse user behavior detection.

FIG. 4 illustrates an overview of an example method 400 for adverse user behavior detection. In examples, aspects of method 400 are performed by a social media platform, such as social media platform 102 in FIG. 1. In some examples, aspects of method 400 are performed by a user evaluator, such as user evaluator 112 in FIG. 1.

Method 400 begins at operation 402, where an indication that a user account was removed from a buffer is received. In examples, the indication is received as a result of a social metric processor (e.g., social metric processor 110 in FIG. 1) performing operation 220 of method 200 in FIG. 2. Thus, the indication may be received when an untrusted user account is removed from a buffer. In some instances, the indication may comprise an indication as to a target entity associated with the removal, such as a target user account, a target post, or a target video stream.

At operation 404, activity history is accessed for the user account. The activity history may be stored by a user data store, such as user data store 114 in FIG. 1. The activity history may comprise information based at least in part on one or more previous indication similar to that which was received at operation 402. For example, the user account may have been previously removed from other buffers of the social platform.

Flow progresses to determination 406, where it is determined whether the accessed activity history exceeds a threshold. For example, the determination may comprise evaluating a frequency with which the user account is removed from buffers of the social platform. As another example, the evaluation may comprise more specifically evaluating whether the user account has been previously removed from a buffer of the same target entity for which the user account was most recently removed (e.g., as indicated by the indication received at operation 402). In some instances, a predetermined threshold may be used, where removals above the predetermined threshold may indicate that the user account is exhibiting adverse behavior. It will be appreciated that any of a variety of alternative or additional techniques may be used, such as a machine learning model that is trained to classify buffer removals that are associated with new user accounts versus programmatically controlled user accounts, among other examples.

Accordingly, if it is determined at determination 406 that the activity does not exceed a predetermined threshold, flow branches "NO" to operation 308, where an indication is stored in the activity history for the user account (e.g., as may be stored by a user data store, such as user data store 114 in FIG. 1) that the user account was removed from a buffer. In examples, the stored indication comprises a target entity associated with the removal, a timestamp associated with the removal, and/or an estimated or actual amount of time that the user account spent in the buffer from which it was removed. It will be appreciated that less, additional, or alternative information may be stored as part of the indication, as may be used at determination 406 according to aspects described herein. Flow terminates at operation 408.

However, if it is determined at determination 410 that the activity history exceeds the predetermined threshold, flow instead branches "YES" to operation 410, where one or more corrective actions are performed. For example, the user account may be at least temporarily prohibited from performing actions associated with the target entity. As another example, the user account may have reduced privileges on the social media platform or actions performed by the user account may not be visible to other users of the social platform for at least a predetermined period of time. It will be appreciated that any of a variety of other corrective actions may be performed in addition to or as an alternative to the corrective actions described herein. Flow terminates at operation 410.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
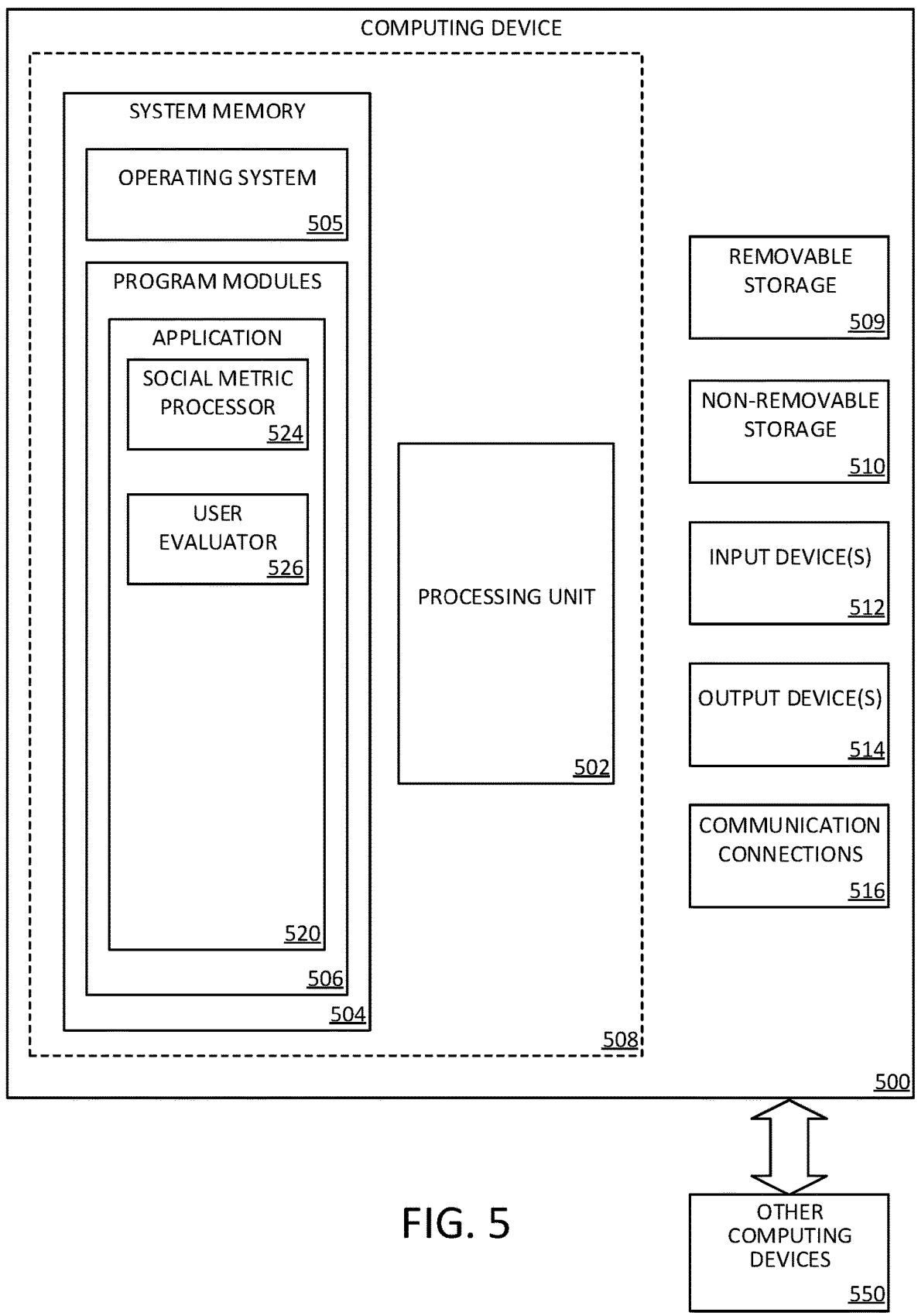
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices described above, including devices associated with social platform 102 or client devices 104 and 106 in FIG. 1. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for running software application 520, such as one or more components supported by the systems described herein. As examples, system memory 504 may store social metric processor 524 and user evaluator 526. The operating system 505, for example, may be suitable for controlling the operation of the computing device 500.

Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media.

Computer storage media may include volatile and non-volatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
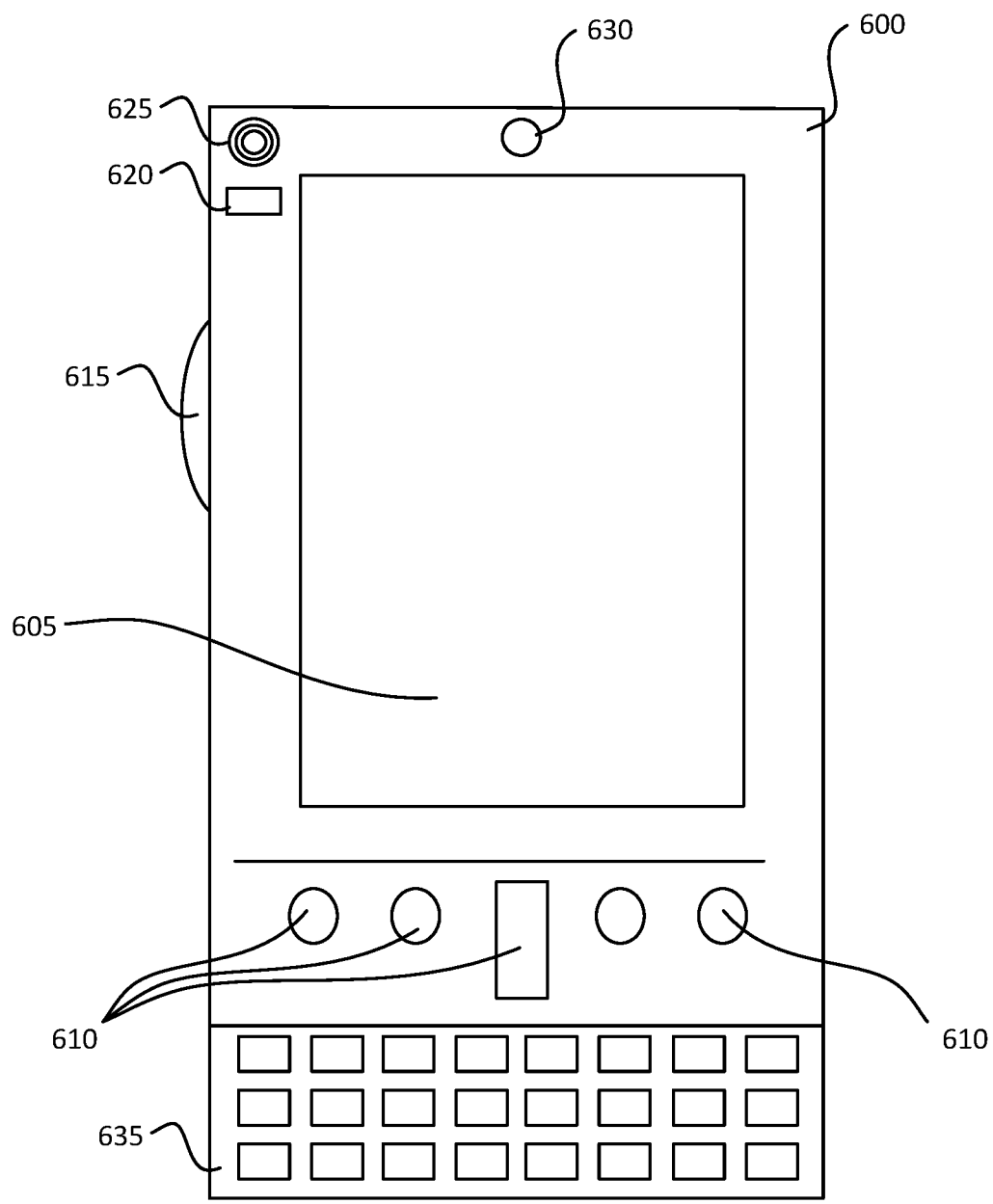
FIGS. 6A and 6B are simplified block diagrams of a mobile computing device with which aspects of the present disclosure may be practiced.
Figure 6B:
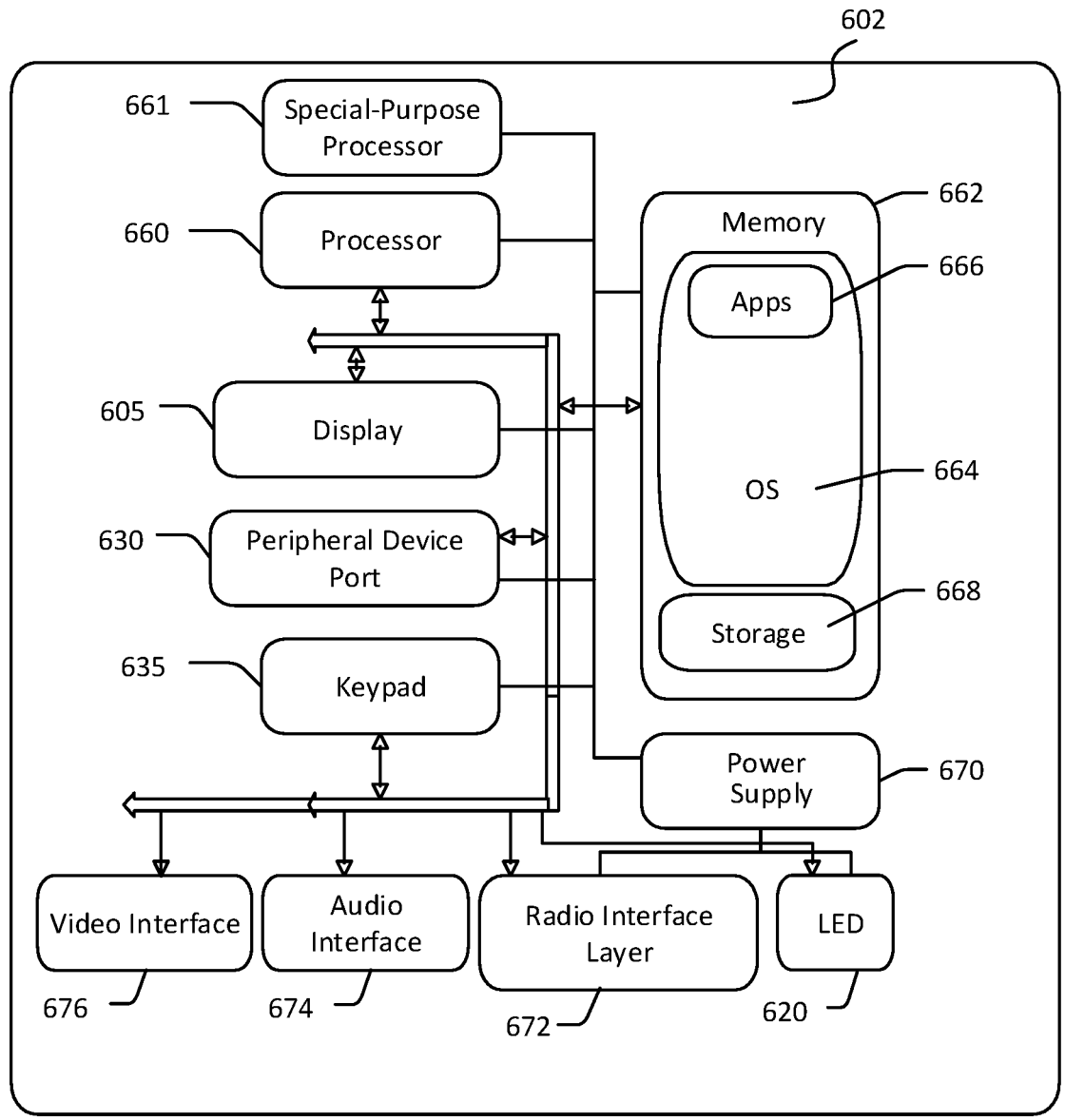

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments.

In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display.

In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
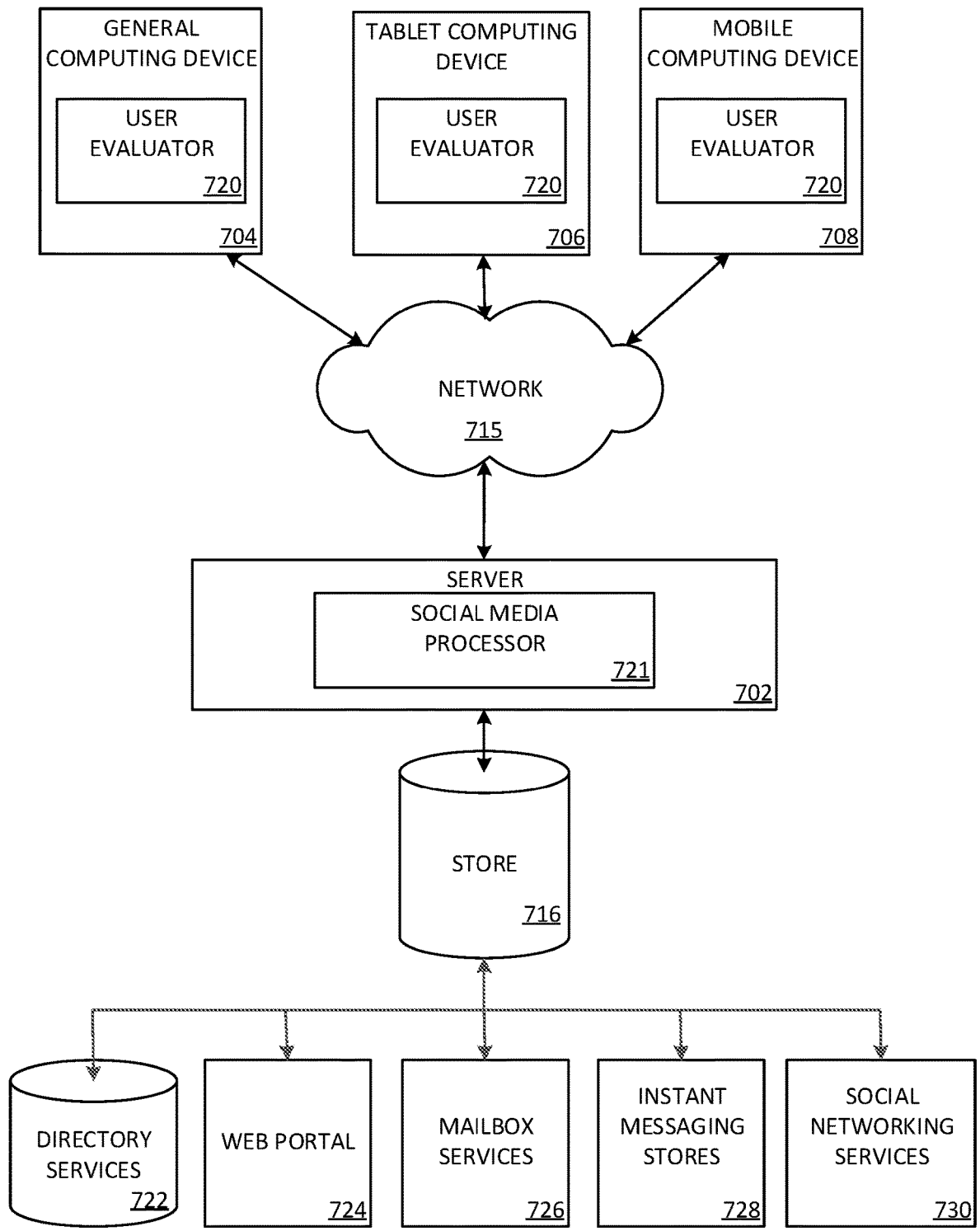
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730.

A user evaluator 720 may be employed by a client that communicates with server device 702, and/or social media processor 721 (e.g., performing aspects similar to those of social metric processor 110 and user evaluator 112 in FIG. 1) may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
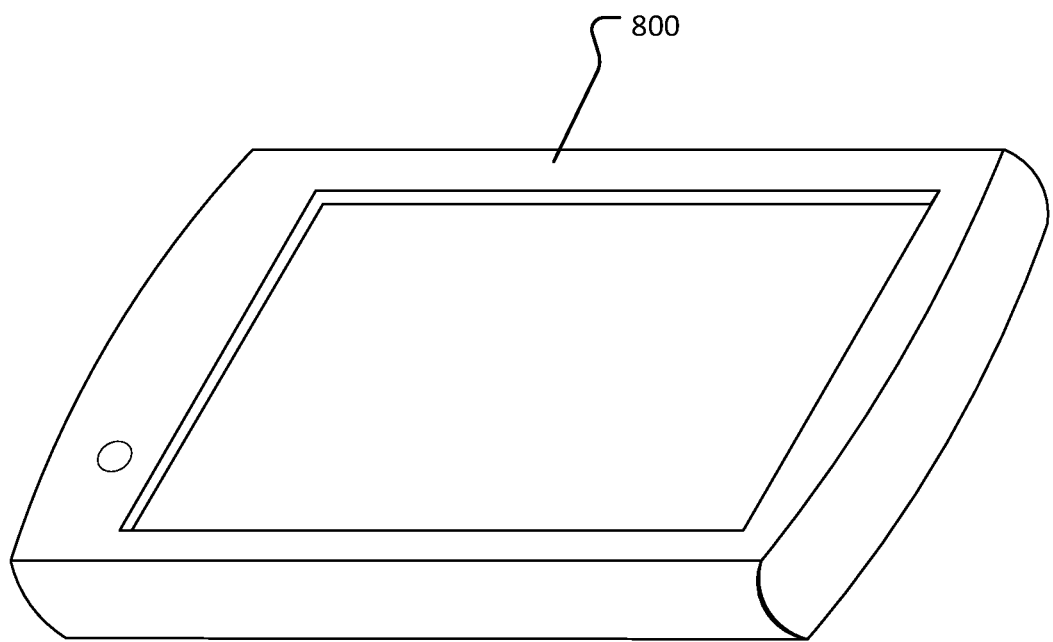
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: receiving a request to follow a target user account of a social platform, wherein the request is associated with a requesting user account; determining whether the requesting user account is a trusted user account of the social platform; when it is determined that the requesting user account is a trusted user account; adding the requesting user account to a set of followers of the target user account; and when it is determined that the requesting user account is not a trusted user account, buffering the request to follow the target user account. In an example, the set of operations further comprises: generating a social metric associated with the target user account based at least in part on the set of followers of the trusted user account and a buffer associated with the target user account; and providing the generated social metric associated with the target user account. In a further example, buffering the request to follow the target user account comprises: determining whether a buffer associated with the target user account exceeds a predetermined threshold; and when it is determined that the buffer exceeds the predetermined threshold: processing each user account associated with the buffer to generate a set of trusted user accounts; and adding each user account of the set of trusted user accounts to the set of followers of the target user account. In yet another example, processing each user account to generate the set of trusted user accounts comprises: determining whether each user account associated with the buffer is a trusted user account of the social platform based at least in part on an associated set of user activity signals. In a further still example, buffering the request to follow the user account further comprises: when it is determined that the buffer exceeds the predetermined threshold: removing each user account from the buffer that is not in the set of trusted user accounts. In another example, the predetermined threshold is programmatically determined based at least in part on a social metric associated with the target user account. In a further example, the requesting user account is in the generated set of trusted user accounts; and the requesting user account is added to the set of followers of the target user account.

In another aspect, the technology relates to a method of buffering untrusted user account activity associated with a target entity of a social platform. The method comprises: receiving, from a client device associated with an untrusted user account, user activity associated with the target entity of the social platform; buffering the user activity in a buffer associated with the target entity; determining whether the buffer exceeds a predetermined threshold; and when it is determined that the buffer exceeds the predetermined threshold: processing each user account associated with the buffer to generate a set of trusted user accounts; and migrating, for each user account of the set of trusted user accounts, user activity from the buffer to a social metric associated with the target entity. In an example, the method further comprises generating the social metric associated with the target entity based at least in part on the buffer associated with the target entity; and providing the generated social metric associated with the target entity. In another example, processing each user account to generate the set of trusted user accounts comprises: determining whether each user account associated with the buffer is a trusted user account of the social platform based at least in part on an associated set of user signals. In a further example, the method further comprises: determining that the untrusted user account is a now-trusted user account of the social platform, and wherein the now-trusted user account is in the generated set of trusted user accounts and the now-trusted user account is added to the set of followers of the target user account. In yet another example, the untrusted user account has a trust metric below a predetermined trust threshold. In a further still example, the target entity is one of: a target user account of the social platform; or a target post of the social platform. In an example, the social platform is a gaming service and wherein the target entity is at least one of: a target user account of the gaming service; or a target video stream of the gaming service.

In a further aspect, the technology relates to a method for processing a request to follow a target user of a social platform. The method comprises: receiving, from a client device associated with a requesting user account, a request to follow the target user account of a social platform; determining whether the requesting user account is a trusted user account of the social platform; and based on determining that the requesting user account is not a trusted user account, buffering the request to follow the target user account. In an example, the method further comprises; generating a social metric associated with the target user account based at least in part on the a buffer associated with the target user account; and providing, to the client device, the generated social metric associated with the target user account. In another example, buffering the request to follow the target user account comprises: determining whether a buffer associated with the target user account exceeds a predetermined threshold; and based on determining that the buffer exceeds the predetermined threshold: processing each user account associated with the buffer to generate a set of trusted user accounts; and adding each user account of the set of trusted user accounts to the set of followers of the target user account. In a further example, processing each user account to generate the set of trusted user accounts comprises: determining whether each user account associated with the buffer is a trusted user account of the social platform based at least in part on an associated set of user signals. In yet another example, buffering the request to follow the user account further comprises: based on determining that the buffer exceeds the predetermined threshold: removing each user account from the buffer that is not in the set of trusted user accounts. In a further still example, the requesting user account is in the generated set of trusted user accounts; and the requesting user account is added to the set of followers of the target user account.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform a set of operations, the set of operations comprising:
      receiving a request to follow a target user account of a social platform, wherein the request is associated with a requesting user account;
      evaluating a trust metric associated with the requesting user account based on a threshold to determine whether the requesting user account is a trusted user account of the social platform, wherein the trust metric corresponds to a set of signals associated with the requesting user account;
      when it is determined that the requesting user account is a trusted user account, adding the requesting user account to a set of followers of the target user account; and
      when it is determined that the requesting user account is not a trusted user account, updating a buffer data structure based on the request to follow the target user account, wherein the buffer data structure is different than the set of followers of the target user account, thereby buffering the request to follow the target user account.

2. The system of claim 1, wherein the set of operations further comprises:
   generating a social metric associated with the target user account based at least in part on the set of followers of the trusted user account and the buffer data structure associated with the target user account; and
   providing the generated social metric associated with the target user account.

3. The system of claim 1, wherein updating the buffer data structure comprises:
   determining whether the buffer data structure associated with the target user account exceeds a predetermined threshold; and
   when it is determined that the buffer data structure exceeds the predetermined threshold:
      processing each user account associated with the buffer data structure to generate a set of trusted user accounts; and
      adding each user account of the set of trusted user accounts to the set of followers of the target user account.

4. The system of claim 3, wherein processing each user account to generate the set of trusted user accounts comprises:
   determining whether each user account associated with the buffer data structure is a trusted user account of the social platform based at least in part on an associated set of user activity signals.

5. The system of claim 3, wherein updating the buffer data structure further comprises:
   when it is determined that the buffer data structure exceeds the predetermined threshold:
      removing each user account from the buffer data structure that is not in the set of trusted user accounts.

6. The system of claim 3, wherein the predetermined threshold is programmatically determined based at least in part on a social metric associated with the target user account.

7. The system of claim 3, wherein:
   the requesting user account is in the generated set of trusted user accounts; and
   the requesting user account is added to the set of followers of the target user account.

8. A method of processing a request to follow a target user of a social platform, comprising:
   receiving, from a client device associated with a requesting user account, a request to follow the target user account of a social platform;
   evaluating a trust metric associated with the requesting user account based on a threshold to determine whether the requesting user account is a trusted user account of the social platform, wherein the trust metric corresponds to a set of user signals associated with the requesting user account; and
   based on determining that the requesting user account is not a trusted user account, updating a buffer data structure based on the request to follow the target user account, wherein the buffer data structure is different than the set of followers of the target user account, thereby buffering the request to follow the target user account.

9. The method of claim 8, further comprising:
generating a social metric associated with the target user account based at least in part on the buffer data structure associated with the target user account; and
providing, to the client device, the generated social metric associated with the target user account.

10. The method of claim 8, wherein updating the buffer data structure comprises:
determining whether the buffer data structure associated with the target user account exceeds a predetermined threshold; and
based on determining that the buffer data structure exceeds the predetermined threshold:
processing each user account associated with the buffer data structure to generate a set of trusted user accounts; and
adding each user account of the set of trusted user accounts to the set of followers of the target user account.

11. The method of claim 10, wherein processing each user account to generate the set of trusted user accounts comprises:
determining whether each user account associated with the buffer data structure is a trusted user account of the social platform based at least in part on an associated set of user signals.

12. The method of claim 10, wherein updating the buffer data structure further comprises:
based on determining that the buffer data structure exceeds the predetermined threshold:
removing each user account from the buffer data structure that is not in the set of trusted user accounts.

13. The method of claim 10, wherein:
the requesting user account is in the generated set of trusted user accounts; and
the requesting user account is added to the set of followers of the target user account.

* * * * *